(12) United States Patent
Binder

(10) Patent No.: US 9,424,181 B2
(45) Date of Patent: Aug. 23, 2016

(54) ADDRESS MAPPING FOR SOLID STATE DEVICES

(71) Applicant: EMPIRE TECHNOLOGY DEVELOPMENT LLC, Wilmington, DE (US)

(72) Inventor: Yehuda Binder, Hod-Hasharon (IL)

(73) Assignee: Empire Technology Development LLC, Wilmington, DE (US)

( * ) Notice: Subject to any disclaimer, the term of this patent is extended or adjusted under 35 U.S.C. 154(b) by 58 days.

(21) Appl. No.: 14/305,691

(22) Filed: Jun. 16, 2014

(65) Prior Publication Data

US 2015/0363307 A1    Dec. 17, 2015

(51) Int. Cl.
*G11C 29/00* (2006.01)
*G06F 12/02* (2006.01)

(52) U.S. Cl.
CPC .... *G06F 12/0246* (2013.01); *G06F 2212/1036* (2013.01); *G06F 2212/2022* (2013.01)

(58) Field of Classification Search
CPC ............ G06F 12/0607; G06F 12/0246; G06F 2212/2022; G06F 2212/1036; G06F 12/08; G06F 12/109; G06F 2212/656; G06F 11/10; G06F 11/1072; G06F 12/0615; G06F 13/1626; G06F 13/1642; G06F 13/1647; G06F 13/1652; G06F 12/0292; G11C 29/70; G11C 29/808
See application file for complete search history.

(56) References Cited

U.S. PATENT DOCUMENTS

| | | | |
|---|---|---|---|
| 6,625,685 B1 * | 9/2003 | Cho .................... | G06F 12/0607 711/105 |
| 8,621,149 B2 | 12/2013 | Fang et al. | |
| 2004/0093457 A1 | 5/2004 | Heap | |
| 2004/0103237 A1 * | 5/2004 | Mohapatra .......... | G06F 12/0607 711/5 |
| 2009/0235020 A1 * | 9/2009 | Srinivasan .......... | G06F 12/0607 711/106 |
| 2012/0166582 A1 | 6/2012 | Binder | |
| 2013/0086449 A1 * | 4/2013 | Giovannini ......... | G06F 11/1044 714/763 |

FOREIGN PATENT DOCUMENTS

JP    2004164641 A    6/2004

OTHER PUBLICATIONS

"Solid-state drive," Wikipedia, accessed at http://web.archive.org/web/20140331192209/http://en.wikipedia.org/wiki/SSD, last modified on Mar. 31, 2014, pp. 1-30.

(Continued)

*Primary Examiner* — Guerrier Merant
(74) *Attorney, Agent, or Firm* — Moritt Hock & Hamroff LLP; Steven S. Rubin, Esq.

(57) ABSTRACT

Technologies are generally described for systems, devices and methods relating to swapping bits in memory addresses in solid state devices. In some examples, a bit swap module may receive a first memory address. The first memory address may include a first bit value at a first position of the first memory address and/or a second bit value at a second position of the first memory address. The bit swap module may swap the first bit value with the second bit value to produce a second memory address. The second memory address may be sent to a memory controller. In some examples, the first memory address may relate to a first package of memory and the second memory address may relate to a second package of memory.

19 Claims, 5 Drawing Sheets

(56) References Cited

OTHER PUBLICATIONS

"Wear leveling," Wikipedia, accessed at http://web.archive.org/web/20140605101131/http://en.wikipedia.org/wiki/Wear_leveling, last modified on Apr. 6, 2014, pp. 1-7.

Min, C., et al., "SFS: Random Write Considered Harmful in Solid State Drives," Proceeding FAST'12 Proceedings of the 10th USENIX conference on File and Storage Technologies, 2012, pp. 12-27.

Schwarz, T., "Memory Cache Layouts," accessed at http://web.archive.org/web/20100810172148/http://www.cse.scu.edu/—tschwarz///coen180/LN/mcache.html, accessed on Jun. 13, 2014, pp. 1-3.

* cited by examiner

ADDRESS MAPPING FOR SOLID STATE DEVICES

BACKGROUND

Unless otherwise indicated herein, the materials described in this section are not prior art to the claims in this application and are not admitted to be prior art by inclusion in this section.

Solid state data storage devices may be used in an information technology infrastructure to handle intensive data access workloads. A solid state storage device may include a multitude of transistors controlled by a solid state memory controller. Solid state storage devices may include one or more memory blocks of transistors. Each transistor may be configured to store one bit of data. Transistors may have a limited number of program/erase cycles before such transistors degrade.

SUMMARY

In some examples, methods to process a first memory address are generally described. In some examples, the methods may include receiving, by a bit swap module, the first memory address. The first memory address may include a first bit value at a first position of the first memory address and/or a second bit value at a second position of the first memory address. In some further examples, the methods may include swapping, by the bit swap module, the first bit value with the second bit value to produce a second memory address. In various other examples, the methods may further include sending the second memory address, by the bit swap module, to a memory controller. In some examples, the first memory address may relate to a first package of memory and the second memory address may relate to a second package of memory.

In some examples, systems are generally described. In various examples, the systems may include a processor and a bit swap module configured to be in communication with the processor. In some examples, the processor may be configured to receive a first memory address. The first memory address may include a first bit value at a first position of the first memory address and a second bit value at a second position of the first memory address. In other examples, the processor may be further configured to send the first memory address to the bit swap module. In some examples, the bit swap module may be configured to swap the first bit value with the second bit value to produce a second memory address. In various examples, the first memory address may relate to a first package of memory and the second memory address may relate to a second package of memory.

In some other examples, memory devices are generally described. In some examples, the memory devices may include a bit swap module and/or a memory controller configured to be in communication with the bit swap module. In some other examples, the memory devices may include two or more memory packages configured to be in communication with the memory controller. In some examples, the bit swap module may be effective to receive a first memory address. The first memory address may include a first bit value at a first position of the first memory address and/or a second bit value at a second position of the first memory address. In some other examples, the bit swap module may be further effective to swap the first bit value with the second bit value to produce a second memory address. In further examples, the bit swap module may be further effective to send the second memory address to the memory controller. In some examples, the memory controller may be effective to receive the second memory address. In various other examples, the memory controller may be further effective to select a particular memory package from among the two or more memory packages based on the second memory address.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
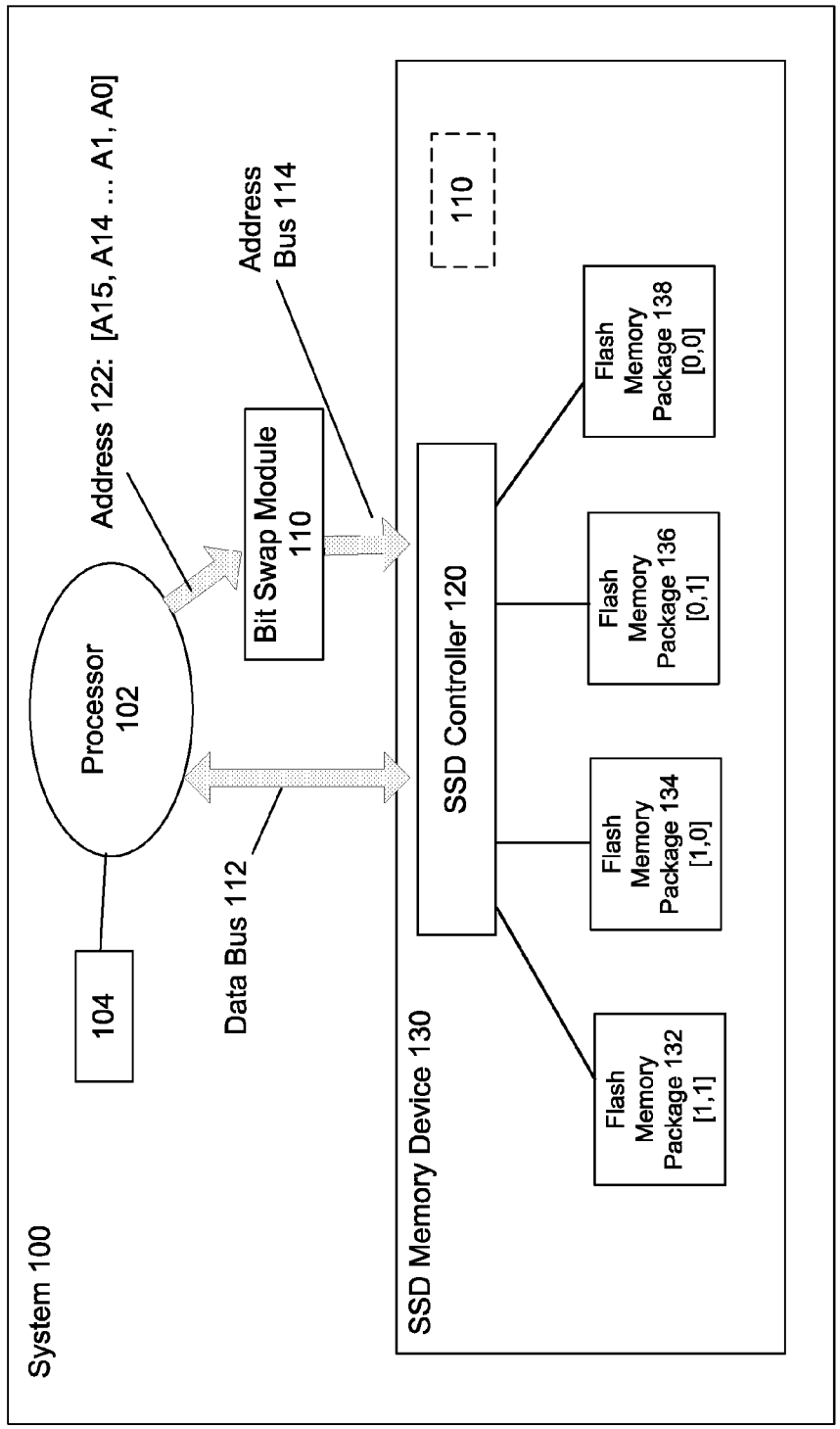
FIG. 1 illustrates an example system that can be utilized to implement swapping bits in memory addresses in solid state devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to swapping bits in memory addresses in solid state devices.

Briefly stated, technologies are generally described for systems, devices and methods relating to swapping bits in memory addresses in solid state devices. In some examples, a bit swap module may receive a first memory address. For example, a bit swap module may receive a first memory address related to a first location in a memory (e.g., "1 3 2 0"). The first memory address may include a first bit value at a first position of the first memory address and/or a second bit value at a second position of the first memory address. For example, the first memory address may include a most significant bit value of "1" and a least significant bit value of "0." The bit swap module may swap the first bit value with the second bit value to produce a second memory address. In the example, the bit swap module may swap the most significant bit value with the least significant bit value such that, after the swap, the most significant bit value may be "0" and the least significant bit value may be "1." The second memory address (e.g., "0 3 2 1") may be sent to a memory controller. In some examples, the first memory address may relate to a first package of memory and the second memory address may relate to a second package of memory.

FIG. 1 illustrates an example system 100 that can be utilized to implement swapping bits in memory addresses in solid state devices, arranged according to at least some embodiments described herein. As depicted, system 100 may include a processor 102, a memory 104, a bit swap module 110 and/or a solid state drive ("SSD") memory device 130. SSD memory device 130 may include an SSD controller 120 and flash memory packages 132, 134, 136, and/or 138. Flash memory packages 132, 134, 136, and/or 138 may be solid state memory and may include one or more chips, planes, blocks, pages, and/or other groupings of transistors. In some examples, flash memory packages 132, 134, 136, and/or 138 may be effective to store data. Memory 104 may be a memory associated with processor 102. For example, memory 104 may be an L1, L2, and/or L3 cache. Processor 102 may be configured to be in communication with SSD Controller 120 of SSD memory device 130 through a data bus 112 and/or an address bus 114.

In some examples, data bus 112 and/or address bus 114 may each be a bus, via, interconnect, or other communication line effective to couple processor 102 to SSD controller 120. In some examples, address bus 114 may communicate an address 122 from processor 102 to SSD controller 120. Address 122 may relate to a physical or virtual address in flash memory packages 132, 134, 136, or 138. In some examples, data bus 112 may communicate data to be written to, and/or read from, flash memory packages 132, 134, 136, or 138. Data bus 112 may communicate data from processor 102 to SSD controller 120. SSD Controller 120 may be effective to control writing to, and/or reading from, one or more of flash memory packages 132, 134, 136, and/or 138.

In some examples, address 122 may include a number of bit values. In some cases, SSD controller 120 may use some of the bit values to determine in which package to write data to, or read data from. For example, address 122 may be communicated from processor 102 and/or bit swap module 110 to SSD controller 120 by address bus 114. Address 122 may be a 16 bit word, including a most significant bit value (e.g., the bit value in bit position A15) and a least significant bit value (e.g., the bit value in bit position A0). In some examples, the two most significant bit values of address 122 (e.g., the bit values in bit positions A15 and A14, respectively) may be used by SSD Controller 120 to determine to which flash memory package to write to, or read from. In the example, if the two most significant bit values of address 122 are [1, 1], SSD Controller 120 may write data to flash memory package 132. If the two most significant bit values of address 122 are [1, 0], SSD Controller 120 may write data to flash memory package 134. If the two most significant bit values of address 122 are [0, 1], SSD Controller 120 may write data to flash memory package 136; and, if the two most significant bit values of address 122 are [0, 0], SSD Controller 120 may write data to flash memory package 138. In these examples, the remainder of the bit values in address 122 (e.g., the bit values in bit positions A13 to A0), may specify a particular physical address or location within the selected flash memory package 132, 134, 136, and/or 138.

Bit swap module 110 may be hardware, or some combination of hardware and instructions executable on the hardware. As will be discussed in further detail below, bit swap module 110 may be configured to receive address 122. Bit swap module 110 may be configured to swap or exchange the bit values of the bits at two or more bit positions of address 122. In some examples, bit swap module 110 may swap bit values of address 122 based on instructions stored in memory 104 and/or stored in SSD memory device 130. In some examples, bit swap module 110 may be part of SSD memory device 130. In other examples, bit swap module 110 may be located externally to SSD memory device 130.

Figure 2:
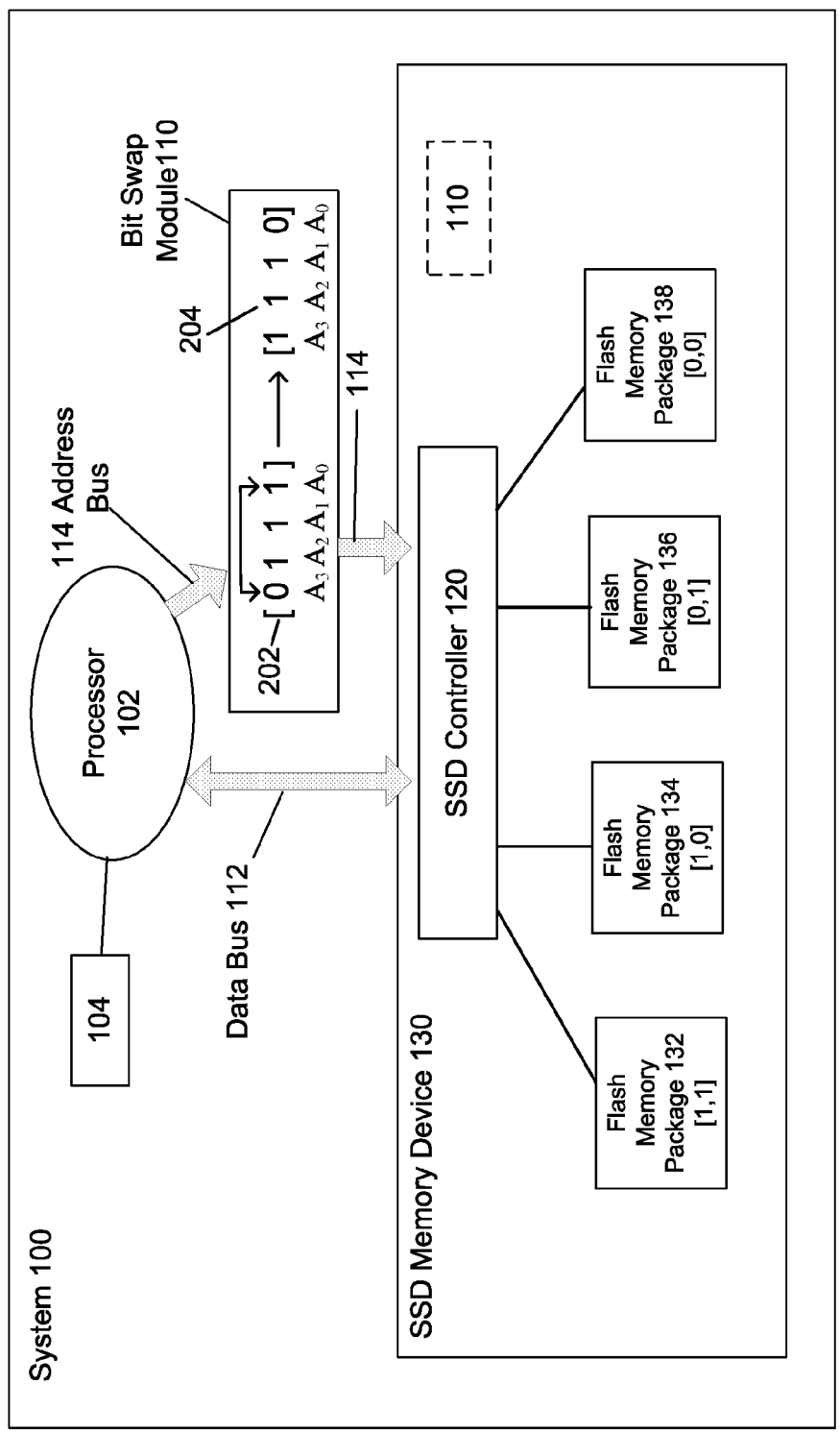
FIG. 2 depicts the example system of FIG. 1 with additional details related to a bit swap module.

FIG. 2 depicts system 100 of FIG. 1 with additional details related to a bit swap module, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity and brevity.

In one example, a 4-bit address 202 may be received by bit swap module 110. Bit swap module 110 may be effective to swap the value of the most significant bit in address 202 with the value of the least significant bit to produce a modified address 204. In the example depicted in FIG. 2, address 202 and modified address 204 may include bit positions [A3, A2, A1, A0], with the bit value in position A3 being the most significant bit value and the bit value in position A0 being the least significant bit value. Bit swap module 110 may swap the bit values of bit positions A3 and A0 of address 202 to produce modified address 204 based on, for example, instructions stored in memory 104. Bit swap module 110 may be effective to send modified address 204 to SSD controller 120.

In one example, SSD Controller 120 may use the bit values in the two most significant bit positions (e.g., A3 and A2) of modified address 204 to select a flash memory package at which to write to, or read from. In the example depicted in FIG. 2, SSD Controller 120 may determine that data is to be written to and/or read from flash memory package 132, as the bit values in bit positions A3 and A2 of modified address 204 are 1 and 1, respectively. In another example, if the bit values in positions A3 and A2 of modified address 204 were 0 and 1, respectively, SSD controller 120 may determine that data would be written to and/or read from flash memory package 136.

Although address 202 and modified address 204 are depicted as including 4 bits, bit swap module 110 may be effective to swap bit values of addresses of any bit length. In some examples, bit values at any bit positions may be swapped with one another in address 202 to produce modified address 204. In other examples, the most significant bit value may be swapped with the least significant bit value and the second most significant bit value may be swapped with the second least significant bit value to produce modified address 204. In another example, the most significant bit value may be swapped with a bit value at bit position A5 and the second most significant bit value may be swapped with a bit value at bit position A4. Bit values at any combination of bit positions may be swapped.

SSD controller 120 may be effective to select particular flash memory packages based on bit values at any number of bit positions in an address. In the example depicted in FIG. 2, if the two most significant bit values of an address are 0 and 0, SSD controller 120 may select flash memory package 138. Although in the example the two most significant bit values of an address may be used by SSD controller 120 to select a flash memory package, any number of bit values at any bit positions of an address may be used by SSD controller 120 to select a particular flash memory package. Additionally, other swaps may be used in memory addresses besides swapping of bits to select particular flash memory packages. For example, a header portion may be swapped with some other portion of a string of data. In some other examples, bit swapping may be used in other addressing schemes besides memory addressing, such as, for example, processor-peripheral addressing schemes. Some examples of peripherals may include devices such as networked devices, input/output devices, display devices, and other devices which may be configured to be in communication with bit swap module 110.

In some examples, data may be written to sequential memory addresses. After a swap of values of one or more bits of an address by bit swap module 110, the modified memory address may be non-sequential to previous or subsequent memory addresses. Modification of memory addresses may allow for wear leveling in flash memory, as data may be written to different memory locations instead of sequential memory locations. Wear leveling may be, for example, one suitable technique for reducing degradation of memory cells in flash memory. In some examples, two or more memory packages may be arranged or wired in a parallel architecture. In one example, a parallel architecture may allow for different memory packages to be accessed simultaneously. Modification of memory addresses may allow for flash memory packages (such as, for example, flash memory packages 132, 134, 136, and/or 138) to be written to, or read from, in parallel. Parallel access of memory packages may allow for improved read/write speeds.

Among other potential benefits, swapping bits in memory addresses in solid state devices arranged in accordance with the present disclosure may allow parallel operation of reads and writes to an SSD memory device. For example, many operating systems use sequential addressing which accesses memory in a serial fashion. Modified addresses generated through swapping bits in memory addresses may implicate several different packages, each of which may be read from and/or written to in parallel. Parallel implementation may improve read/write speeds in systems implementing swapping bits in memory addresses in solid state devices. Additionally, modification of memory addresses through bit swapping may allow for more consistent wear leveling of flash memory. Additionally, a system in accordance with the disclosure may allow for reductions in cache and/or buffer sizes, which may allow for more direct and faster access to solid state device memory. In some further examples, modification of memory addresses through bit swapping may allow for previously sequential memory addresses to be forwarded to different memory modules, after bit swapping. Additionally, a system in accordance with the disclosure may effectively randomize sequential memory addresses through bit swapping.

Figure 3:
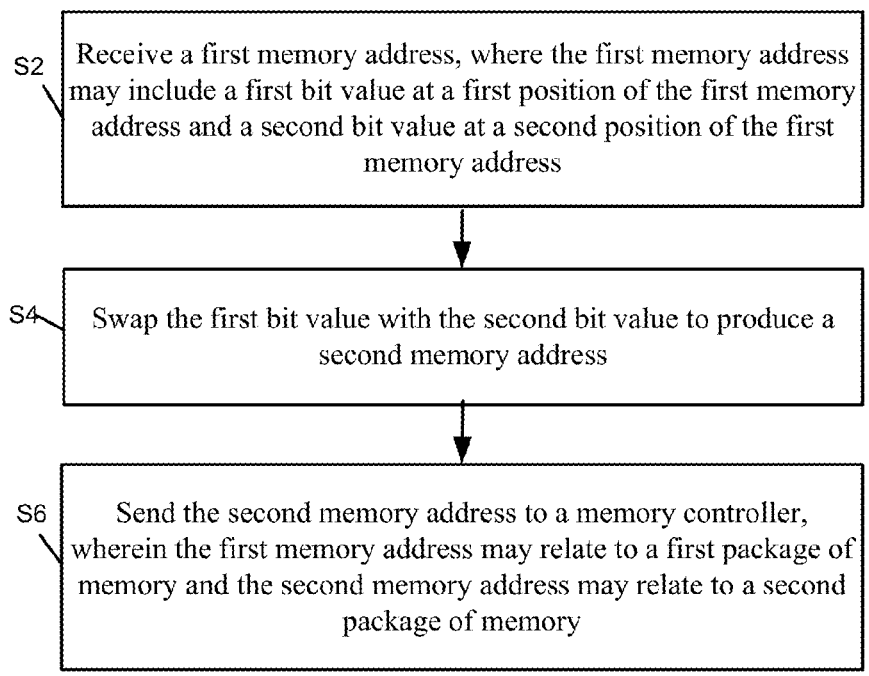
FIG. 3 depicts a flow diagram for an example process to implement swapping bits in memory addresses in solid state devices.

FIG. 3 depicts a flow diagram for example process to implement swapping bits in memory addresses in solid state devices, arranged in accordance with at least some embodiments described herein. In some examples, the process in FIG. 3 could be implemented using system 100 discussed above and could be used to modify memory storage addresses. An example process may include one or more operations, actions, or functions as illustrated by one or more of blocks S2, S4, and/or S6, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 3 may be used by a processor, such as processor 102, or by a bit swap module, such as bit swap module 110, as described above.

Processing may begin at block S2, "Receive a first memory address, where the first memory address may include a first bit value at a first position of the first memory address and a second bit value at a second position of the first memory address." At block S2, a bit swap module (e.g., bit swap module 110) may receive the first memory address (e.g., address 122). The first memory address may include a first bit value (e.g., a binary value) at a first position (e.g., positions A15 . . . A0 depicted in FIG. 1) of the first memory address and a second bit value at a second position of the first memory address. In some examples, the first bit value or the second bit value may be a most significant bit value of the first memory address. In some other examples, the first bit value may be a most significant bit value of the first memory address and the second bit value may be a least significant bit value of the first memory address.

Processing may continue from block S2 to block S4, "Swap the first bit value with the second bit value to produce a second memory address." At block S4, the bit swap module (e.g., bit swap module 110) may swap a first bit value with a second bit value to produce a second memory address (e.g., modified address 204).

Processing may continue from block S4 to block S6, "Send the second memory address to a memory controller, wherein the first memory address may relate to a first package of memory and the second memory address may relate to a second package of memory." At block S6, the bit swap module may send the second memory address to a memory controller, such as SSD controller 120. The first memory address may relate to a first package of memory, such as flash memory package 136. The second memory address (e.g., modified address 204) may relate to a second package of memory, such as flash memory package 132. In some examples, the first and second packages of memory may be the same. For example, in cases where the bit values used by SSD controller 120 to select a flash memory package are the same before and after the swap, the flash memory package that would be selected prior to the swap, and the flash memory package that may be selected after the swap, may be the same. In some other examples, the first and second packages of memory may be different. In some examples, the memory controller may select the second package to write data to, based on a most significant bit value of the first memory address. In various examples, the second memory address (e.g., modified address 204) may be used to write data to, or read data from, the second package of memory. In some other examples, the first and second packages of memory may be flash memory packages. In some examples, the first and second packages of memory may be divided into one or more chips, planes, blocks, and/or pages. In some other examples, the first and second packages of memory may be arranged in a parallel architecture. The memory controller may be effective to access the two or more memory packages in parallel. The memory controller may include an address bus and/or a data bus. In some examples, the address bus may be effective to communicate the second memory address from the processor to the memory controller. The data bus may be effective to communicate data from the processor to the memory controller.

Figure 4:
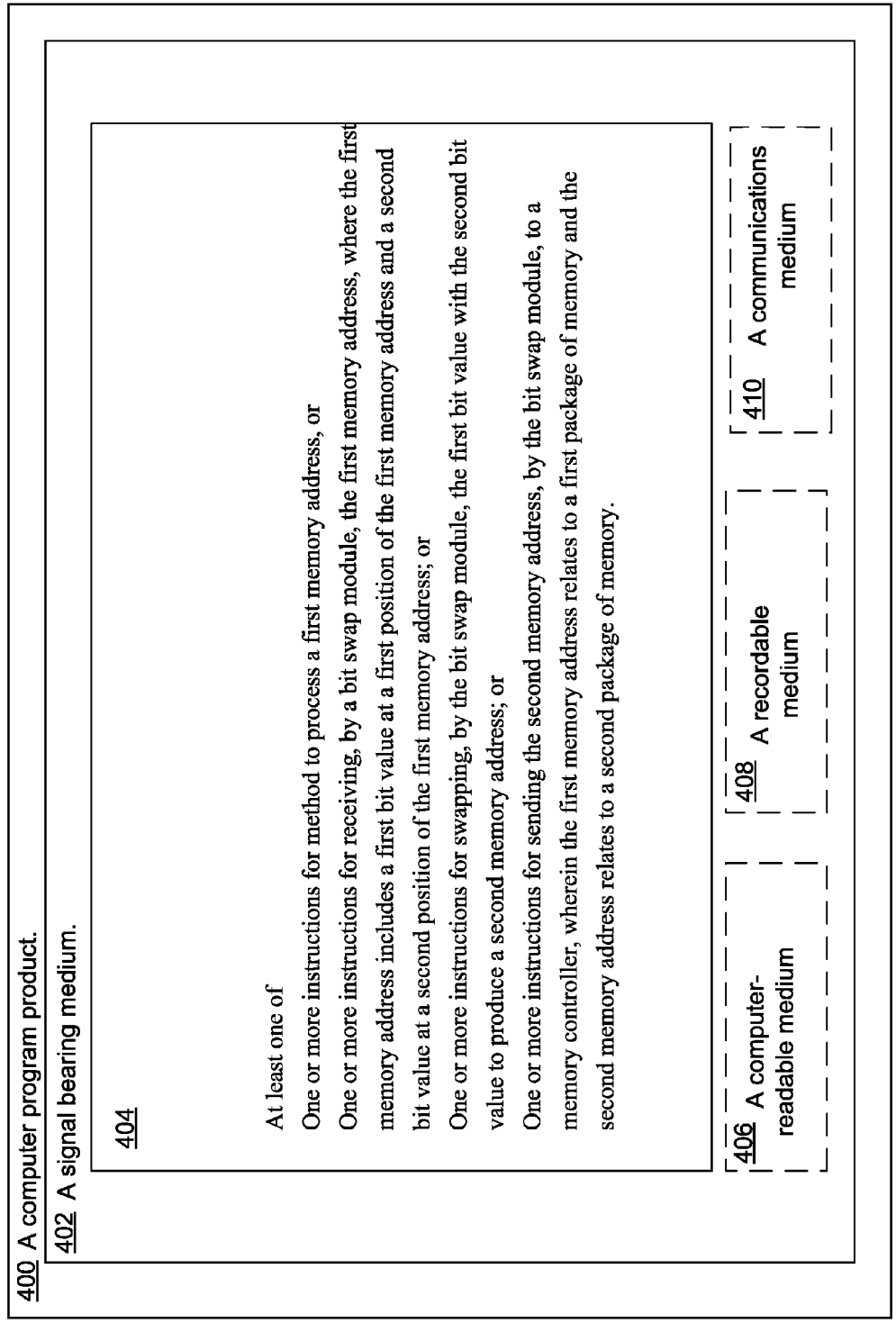
FIG. 4 illustrates an example computer program product that can be utilized to implement swapping bits in memory addresses in solid state devices.

FIG. 4 illustrates an example computer program product 400 that can be utilized to implement swapping bits in memory addresses in solid state devices, arranged in accordance with at least some embodiments described herein. Computer program product 400 may include a signal bearing medium 402. Signal bearing medium 402 may include one or more instructions 404 that, in response to execution by, for example, a processor, may provide the functionality and features described above with respect to FIGS. 1-3. Thus, for example, referring to system 100, processor 102 and/or bit swap module 110 may undertake one or more of the blocks shown in FIG. 4 in response to instructions 404 conveyed to system 100 by signal bearing medium 402. In some examples, instructions 404 may be stored in a memory, such as memory 104.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
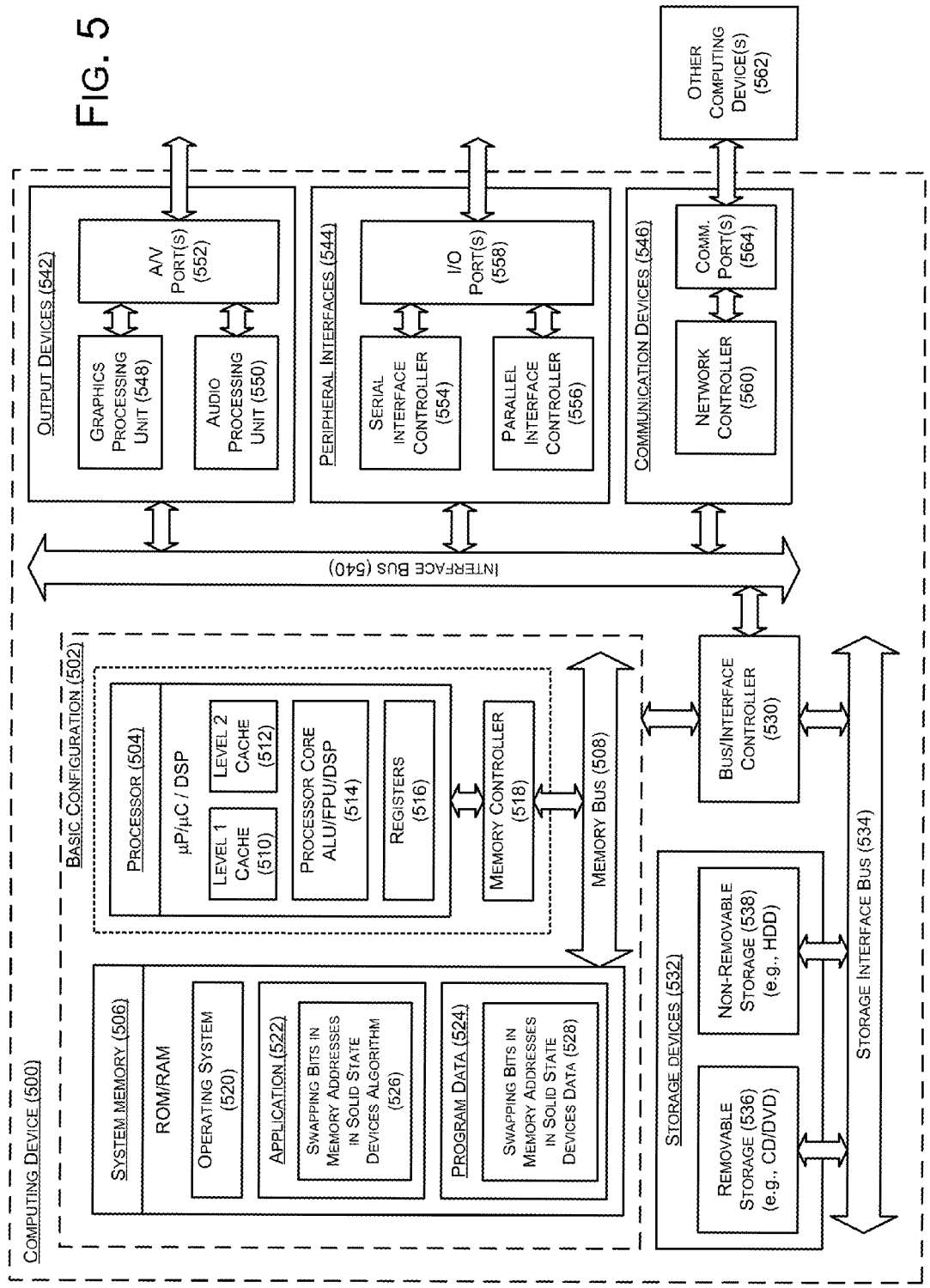
FIG. 5 is a block diagram illustrating an example computing device that is arranged to implement swapping bits in memory addresses in solid state devices, all arranged according to at least some embodiments described herein.

FIG. 5 is a block diagram illustrating an example computing device 500 that is arranged to implement swapping bits in memory addresses in solid state devices, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one Cache 510 and a level two Cache 512, a processor Core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any Type including but not limited to volatile memory (such as RAM), non-volatile memory (such as ROM, flash memory, etc.) or any combination thereof. System memory 506 may include an operating system 520, one or more applications 522, and program data 524. Application 522 may include swapping bits in memory addresses in solid state devices algorithm 526 that is arranged to perform the functions and operations as described herein including those described with respect to FIGS. 1-4 in connection with system 100. Program data 524 may include swapping bits in memory addresses in solid state devices data 528 that may be useful to implement swapping bits in memory addresses in solid state devices as is described herein. In some embodiments, application 522 may be arranged to operate in cooperation with program data 524 and/or operating system 520 such that swapping bits in memory addresses in solid state devices may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 Cells refers to groups having 1, 2, or 3 Cells. Similarly, a group having 1-5 Cells refers to groups having 1, 2, 3, 4, or 5 Cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to process a first memory address, the method comprising:
   receiving, by a bit swap module, the first memory address, where the first memory address includes a first bit value at a first position of the first memory address and a second bit value at a second position of the first memory address;
   swapping, by the bit swap module, the first bit value with the second bit value to modify the first memory address into a second memory address;
   sending the second memory address, by the bit swap module, to a solid state memory controller of a solid state memory, wherein the first memory address relates to a first flash memory package of the solid state memory and the second memory address relates to a second flash memory package of the solid state memory, wherein the solid state memory controller is effective to selectively control writing to and/or reading from the first and second flash memory packages.

2. The method of claim 1, wherein the first bit value is a most significant bit value of the first memory address.

3. The method of claim 1, wherein the first bit value or the second bit value is a most significant bit value of the first memory address.

4. The method of claim 1, wherein:
   the first bit value is a most significant bit value of the first memory address; and
   the second bit value is a least significant bit value of the first memory address.

5. The method of claim 1, further comprising selecting, by the solid state memory controller, the second flash memory package to write data to, based on a most significant bit value of the second memory address.

6. The method of claim 1, further comprising using the second memory address to write data to, or read data from, the second flash memory package of the solid state memory.

7. The method of claim 1, wherein the first flash memory package of the solid state memory is different from the second package of the solid state memory.

8. A system comprising:
a processor; and
a bit swap module configured to be in communication with the processor;
wherein the processor is configured to:
  receive a first memory address that includes a first bit value at a first position of the first memory address and a second bit value at a second position of the first memory address; and
  send the first memory address to the bit swap module;
the bit swap module being configured to:
  swap the first bit value with the second bit value to modify the first memory address into a second memory address, wherein the first memory address relates to a first flash memory package of a solid state memory and the second memory address relates to a second flash memory package of the solid state memory; and
  send the second memory address to a solid state memory controller of the solid state memory, wherein the solid state memory controller is effective to selectively control writing to and/or reading from the first and second flash memory packages.

9. The system of claim 8, further comprising:
an address bus configured to be in communication with the processor, the address bus being configured to communicate the second memory address from the processor to the solid state memory controller; and
a data bus configured to be in communication with the processor and the solid state memory controller, the data bus being configured to communicate data from the processor to the solid state memory controller.

10. The system of claim 8, wherein the first bit value is a most significant bit value of the first memory address.

11. The system of claim 8, wherein:
the first bit value is a most significant bit value of the first memory address; and
the second bit value is a least significant bit value of the first memory address.

12. The system of claim 8, wherein the first flash memory package of the solid state memory is different from the second flash memory package of the solid state memory.

13. The system of claim 8, wherein:
the first flash memory package of the solid state memory or the second flash memory package of the solid state memory is divided into one or more chips, planes, blocks, and/or pages.

14. A memory device comprising:
a bit swap module;
two or more flash memory packages; and
a solid state memory controller configured to be in communication with the bit swap module and the two or more flash memory packages, wherein the solid state memory controller is effective to selectively control writing to and/or reading from the two or more flash memory packages; and
the bit swap module is configured to:
  receive a first memory address that includes a first bit value at a first position of the first memory address and a second bit value at a second position of the first memory address;
  swap the first bit value with the second bit value to modify the first memory address into a second memory address; and
  send the second memory address to the solid state memory controller;
the solid state memory controller configured to:
  receive the second memory address; and
  select a particular flash memory package from among the two or more flash memory packages based on the second memory address.

15. The memory device of claim 14, further comprising:
an address bus configured to be in communication with a processor, the address bus being configured to communicate the second memory address from the processor to the solid state memory controller; and
a data bus configured to be in communication with the processor and the solid state memory controller, the data bus being configured to communicate data from the processor to the solid state memory controller.

16. The memory device of claim 14, wherein the two or more flash memory packages are arranged in a parallel architecture, and wherein the solid state memory controller is further configured to access the two or more flash memory packages in parallel.

17. The memory device of claim 14, wherein the two or more memory packages are divided into one or more chips, planes, blocks, and/or pages.

18. The memory device of claim 14, wherein:
the first bit value is a most significant bit value of the first memory address; and
the second bit value is a least significant bit value of the first memory address.

19. The memory device of claim 14, wherein the first bit value is a most significant bit value of the first memory address.

* * * * *